US008865269B2

(12) United States Patent
Nagata

(10) Patent No.: US 8,865,269 B2
(45) Date of Patent: *Oct. 21, 2014

(54) METHOD OF FORMING A PROTECTIVE FILM FOR A MAGNETIC RECORDING MEDIUM, A PROTECTIVE FILM FORMED BY THE METHOD AND A MAGNETIC RECORDING MEDIUM HAVING THE PROTECTIVE FILM

(75) Inventor: Naruhisa Nagata, Matsumoto (JP)

(73) Assignee: Fuji Electric Co., Ltd. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/453,321

(22) Filed: Apr. 23, 2012

(65) Prior Publication Data
US 2012/0207946 A1    Aug. 16, 2012

Related U.S. Application Data

(62) Division of application No. 12/549,244, filed on Aug. 27, 2009, now Pat. No. 8,182,883.

(30) Foreign Application Priority Data

Aug. 27, 2008    (JP) .................................. 2008-218568

(51) Int. Cl.
C23C 16/50      (2006.01)
G11B 5/73      (2006.01)
G11B 5/84      (2006.01)
G11B 5/667     (2006.01)

(52) U.S. Cl.
CPC .............. *G11B 5/732* (2013.01); *G11B 5/7325* (2013.01); *G11B 5/8408* (2013.01); *G11B 5/667* (2013.01)
USPC ............................ 427/535; 427/532; 427/577

(58) Field of Classification Search
None
See application file for complete search history.

(56) References Cited

U.S. PATENT DOCUMENTS

| 4,816,334 A | 3/1989 | Yokoyama et al. |
| 4,996,079 A | 2/1991 | Itoh |
| 5,053,246 A | 10/1991 | Shuttleworth et al. |

(Continued)

FOREIGN PATENT DOCUMENTS

| JP | 2-91838 A | 3/1990 |
| JP | 09-040494 A | 2/1997 |

(Continued)

OTHER PUBLICATIONS

Jungo, JP2004-280888, Mar. 2003, English machine translation.*

(Continued)

*Primary Examiner* — Joseph Miller, Jr.
(74) *Attorney, Agent, or Firm* — Rossi, Kimms & McDowell LLP

(57) ABSTRACT

A method of forming a protective film of a magnetic recording medium is provided that achieves a good bonding characteristic with a lubricant film and at the same time, suppressing adhesion of contamination gases, to attain a reduced thickness of the magnetic recording medium. The method includes forming a protective film on a lamination including a substrate and a metallic film layer formed on the substrate, by means of a plasma CVD method using a raw material of a hydrocarbon gas, and performing a surface treatment on the protective film. The surface treatment includes a plasma treatment with argon gas, and a plasma treatment with a gas containing at least nitrogen gas.

28 Claims, 1 Drawing Sheet

(56) References Cited

U.S. PATENT DOCUMENTS

| | | | |
|---|---|---|---|
| 5,462,784 A | 10/1995 | Grill et al. | |
| 5,556,707 A | 9/1996 | Usuki et al. | |
| 5,618,639 A | 4/1997 | Ohno et al. | |
| 5,674,638 A | 10/1997 | Grill et al. | |
| 5,837,357 A | 11/1998 | Matsuo et al. | |
| 5,981,000 A | 11/1999 | Grill et al. | |
| 6,066,399 A | 5/2000 | Hirano et al. | |
| 6,354,008 B1 | 3/2002 | Domoto et al. | |
| 6,391,419 B1 | 5/2002 | Katayama et al. | |
| 6,455,101 B1 | 9/2002 | Sasaki et al. | |
| 6,468,602 B2 | 10/2002 | Sakaguchi et al. | |
| 6,528,115 B1 | 3/2003 | Hirano et al. | |
| 6,571,729 B2 | 6/2003 | Sasaki et al. | |
| 6,613,459 B1 | 9/2003 | Saito et al. | |
| 6,911,272 B2 | 6/2005 | Katayama | |
| 7,354,629 B2 | 4/2008 | Nagata | |
| 2002/0011212 A1 | 1/2002 | Ogawa et al. | |
| 2002/0021522 A1 | 2/2002 | Kondo et al. | |
| 2002/0028286 A1 | 3/2002 | Sasaki et al. | |
| 2002/0028358 A1 | 3/2002 | Ishibashi et al. | |
| 2002/0034107 A1 | 3/2002 | Saito | |
| 2002/0064606 A1 | 5/2002 | Sakaguchi et al. | |
| 2003/0224212 A1 | 12/2003 | Sonoda et al. | |
| 2004/0028949 A1 | 2/2004 | Ono et al. | |
| 2004/0157006 A1 | 8/2004 | Sato et al. | |
| 2005/0153169 A1 | 7/2005 | Watanabe et al. | |
| 2005/0181198 A1* | 8/2005 | David et al. | 428/304.4 |
| 2007/0210324 A1 | 9/2007 | Kawaguchi et al. | |
| 2008/0310050 A1 | 12/2008 | Osawa et al. | |
| 2010/0086808 A1 | 4/2010 | Nagata | |

FOREIGN PATENT DOCUMENTS

| | | | |
|---|---|---|---|
| JP | 9-128732 A | | 5/1997 |
| JP | 10-053877 A | | 2/1998 |
| JP | 2000268357 A | | 9/2000 |
| JP | 2001126233 A | | 5/2001 |
| JP | 2004-280888 | * | 3/2003 |
| JP | 2003303410 A | | 10/2003 |
| JP | 2004280888 A | | 10/2004 |
| JP | 2004288327 A | | 10/2004 |
| JP | 2005158092 A | | 6/2005 |
| JP | 2007265586 A | | 10/2007 |
| JP | 2008276898 A | | 11/2008 |
| WO | 9914746 A | | 3/1999 |
| WO | 2007114207 A1 | | 10/2007 |

OTHER PUBLICATIONS

JP Office Action issued Jun. 14, 2011 for JP 2005-232364.

JP Office Action issued Jan. 24, 2012 for JP2008-218568.

Search Report issued Aug. 29, 2007 for Signapore Patent Application No. 200604694-0.

Fung, et al., "Deposition of Ultra-Thin Diamond-Like Carbon Protective Coating on Magnetic Disks by Electron Cyclotron Resonance Plasma Technique", Journal of Non-Crystalline Solids 254 (1999), pp. 167-173.

Sun, et al., "Ultrathin Ion-Beam Carbon as an Overcoat for the Magnetic Recording Medium", IEEE Transactions on Magnetics, vol. 39, No. 1, Jan. 2003, pp. 594-598.

Yokosawa, et al., "Reliability of Perpendicular Magnetic Recording Media", Fuji Electric Review, vol. 53, No. 2, (2007), pp. 39-42.

Japanese Office Action issued in corresponding Japanese patent application No. JP2008-325922, dated Jun. 29, 2012, cited in related U.S. Appl. No. 12/644,937. Partial English translation provided.

* cited by examiner

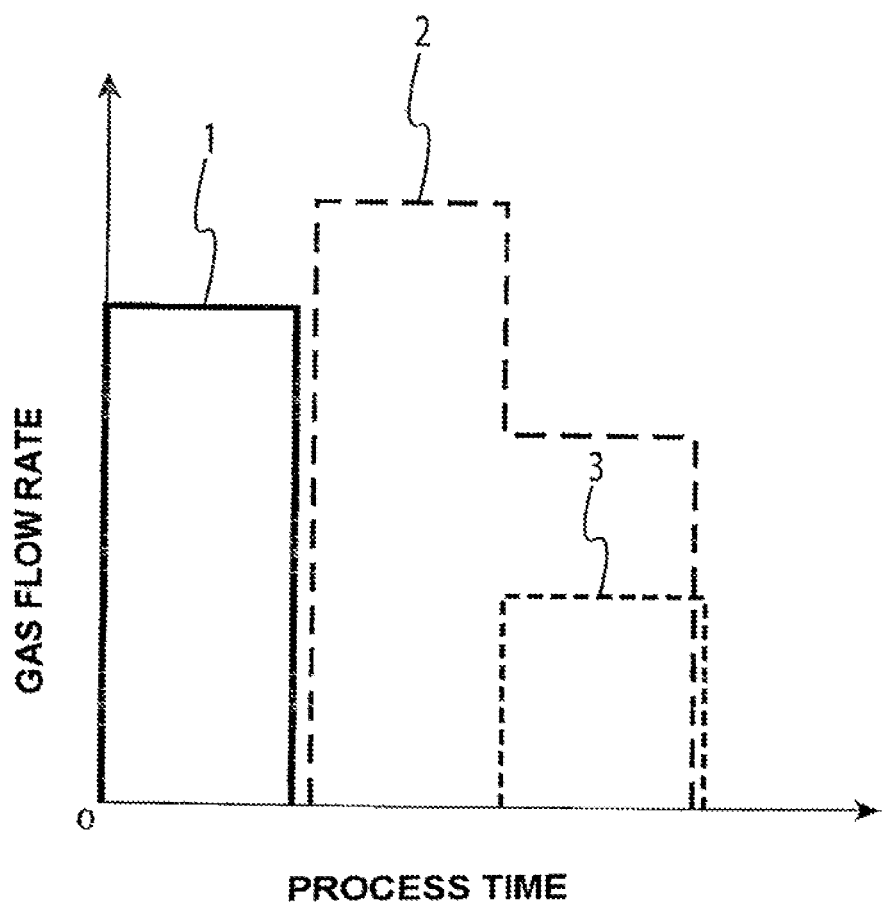

METHOD OF FORMING A PROTECTIVE FILM FOR A MAGNETIC RECORDING MEDIUM, A PROTECTIVE FILM FORMED BY THE METHOD AND A MAGNETIC RECORDING MEDIUM HAVING THE PROTECTIVE FILM

CROSS-REFERENCE TO RELATED APPLICATION

This application is a divisional application of U.S. patent application Ser. No. 12/549,244 filed Aug. 27, 2009, which claims priority to JP 2008-218568, filed Aug. 27, 2008, the contents of which are incorporated herein by reference in their entirety.

BACKGROUND OF THE INVENTION

The present invention relates to a method of forming a protective film for a magnetic recording medium, a protective film formed by the method, and a magnetic recording medium having the protective film.

Hard films made of various substances are used for coating a slide-resistant member or a wear-resistant member. Among them, a diamond like carbon (DLC) film, a hard coating film made of carbon, is known. The DLC film exhibits good surface smoothness and great hardness, and is suited for a surface coating film. The DLC films have conventionally been formed by a sputtering method, a plasma CVD method and the like.

Magnetic recording media today have a protective film of a DLC film formed on a magnetic recording layer by a plasma CVD method. The purpose for the protective film is to protect the magnetic recording layer against corrosion and damages due to contact or sliding with a magnetic head.

The recording systems of magnetic recording media have been changing in recent years from a longitudinal system to a perpendicular system, the latter allowing higher recording density. In the magnetic recording media in the perpendicular system, like in the longitudinal system, the protective film needs to be as thin as possible to attain high recording density while holding the performances of the durability and corrosion resistance.

In addition to the durability and corrosion resistance, a protective film further needs a good bonding characteristic with a lubricant film formed on the protective film and suppression of adhesion of contamination gases. Accordingly, the protective film needs to have an optimal surface composition. A DLC film is known to have a relatively active surface and to be liable to be adhered thereto by acidic impurities, especially sulfur-containing impurities, although it exhibits good durability and corrosion resistance.

In view of this issue, Japanese Unexamined Patent Application Publication No. H09-128732 discloses a method in which a nitrogenized amorphous carbon (a-C:N) film is deposited by a sputtering method on a DLC film formed by a plasma CVD method. The a-C:N film is formed by sputtering a carbon target in a mixture gas containing nitrogen. The method of the document intends to simultaneously attain: (a) compensation for mechanical strength that is insufficient with solely the a-C:N film, by laminating with a DLC film, (b) suppression of adhesion of contamination gases by providing an outermost surface of the protective film with an a-C:N film which contains smaller amount of hydrogen than a DLC film, and (c) good bonding with the lubricant film by virtue of the nitrogen which is contained in the a-C:N film.

Japanese Unexamined Patent Application Publication No. 2001-126233 discloses a method that does not use an a-C:N film and employs direct nitrogenization of the surface of a DLC film formed by a plasma CVD method. The method achieves good bonding with a lubricant film by virtue of the nitrogenization, and at the same time, allows thickness reduction of the protective film owing to absence of an a-C:N film.

The method of Japanese Unexamined Patent Application Publication No. H09-128732 using an a-C:N film, however, suffers from a thickness problem with respect to the protective film due to employment of a lamination, though it sufficiently suppresses adhesion of contamination gases. On the other hand, the method of Japanese Unexamined Patent Application Publication No. 2001-126233 using direct nitrogenization of a DLC film suffers from a problem of insufficient suppression of adhesion of contamination gases due to excessively large amount of hydrogen on the DLC film surface formed by a plasma CVD method, although it is advantageous in thickness reduction of the protective film.

In view of the above, it would be desirable to provide a method of forming a protective film of a magnetic recording medium, the method achieving simultaneously good bonding with a lubricant film and sufficient suppression of adhesion of contamination gases as well as good durability and corrosion resistance to attain reduced thickness of the magnetic recording medium.

SUMMARY OF THE INVENTION

The present invention provides a method of forming a protective film of a magnetic recording medium, the method achieving simultaneously good bonding with a lubricant film and sufficient suppression of adhesion of contamination gases as well as good durability and corrosion resistance to attain reduced thickness of the magnetic recording medium.

In a preferred embodiment, a protective film of a magnetic recording medium, the method being a first aspect of the present invention, is provided that includes forming a protective film on a lamination that includes a substrate and a metallic film layer formed on the substrate, by means of a plasma CVD method using a raw gas of a hydrocarbon gas, and applying a surface treatment to the protective film that has been formed. Preferably, the surface treatment includes a plasma treatment with argon gas, and a plasma treatment with a gas containing at least nitrogen gas, wherein the plasma treatment with argon gas is preferably conducted between the formation of the protective film and the plasma treatment with nitrogen gas.

A protective film of a magnetic recording medium, the protective film being a second aspect of the present invention, is formed by the method of the first aspect of the invention.

A magnetic recording medium that is a third aspect of the present invention comprises a substrate, a metallic film layer, and a protective film formed on the metallic film layer by the method of the first aspect of the invention.

The method of the invention as specified above provides a protective film of a magnetic recording medium achieving simultaneously good bonding with a lubricant film and sufficient suppression of adhesion of contamination gases as well as good durability and corrosion resistance to attain reduced thickness of the magnetic recording medium. A magnetic recording medium of the present invention using such a protective film reduces a spacing between a magnetic head and a magnetic recording layer, and is thus advantageous in achieving high recording density.

Other features, modifications, embodiments and advantages of the invention will become apparent to those skilled in the art from the following detailed description of the preferred embodiments of the invention.

BRIEF DESCRIPTION OF THE DRAWINGS

The invention will be described with reference to certain preferred embodiments thereof and the accompanying drawing, wherein:

FIG. 1 shows the sequence of flow rates of raw gases in Example 1.

DETAILED DESCRIPTION OF THE PREFERRED EMBODIMENTS

The method of forming a protective film of a magnetic recording medium, the method being a first aspect of the present invention, includes forming a protective film on a lamination that includes a substrate and a metallic film layer formed on the substrate, by means of a plasma CVD method using a raw gas of a hydrocarbon gas, and applying a surface treatment to the protective film that has been formed. The surface treatment preferably includes plasma treatment with argon gas, and a plasma treatment with a gas containing at least nitrogen gas.

The substrate is favorably nonmagnetic and can be composed of any material conventionally used in manufacturing magnetic recording media. A useful substrate can be produced using a material selected from NiP-plated aluminum alloy, glass, ceramics, plastics, and silicon, for example.

The metallic film layer formed on the substrate includes at least a magnetic recording layer. Optionally, the metallic film layer can further include a nonmagnetic underlayer, a soft magnetic layer, a seed layer, and an intermediate layer between the magnetic recording layer and the substrate.

The magnetic recording layer can preferably be formed of a ferromagnetic material of an alloy containing at least cobalt and platinum. An axis of easy magnetization of the ferromagnetic material is necessarily oriented in the direction of magnetic recording. For perpendicular magnetic recording, for example, the axis of easy magnetization (c-axis of the hexagonal closest packed (hcp) structure) of the magnetic recording layer is necessarily oriented perpendicularly to the surface of the recording medium (the principal plane of the substrate). The magnetic recording layer can be formed of an alloy material of CoPt, CoCrPt, CoCrPtB, or CoCrPtTa, for example. A thickness of the magnetic recording layer is not limited to a special value; but, preferably at most 30 nm, more preferably at most 15 nm, in view of productivity and recording density enhancement.

The nonmagnetic underlayer, which is optionally provided, can be formed using titanium or a nonmagnetic material containing chromium, for example, a CrTi alloy.

The soft magnetic layer, which is optionally provided, can be composed of crystalline materials such as FeTaC and a sendust alloy (FeSiAl); microcrystalline materials such as FeTaC, CoFeNi, and CoNiP; and amorphous materials such as cobalt alloys of CoZrNd, CoZrNb, and CoTaZr. The soft magnetic layer functions to concentrate a perpendicular magnetic field generated by a magnetic head into the magnetic recording layer in a perpendicular magnetic recording medium. A thickness of the soft magnetic layer is preferably in the range of 10 to 500 nm in balance with productivity although the optimum value changes depending on the structure and characteristics of the magnetic head used for recording.

The seed layer, which is optionally provided, can be formed of: permalloy materials such as NiFeAl, NiFeSi, NiFeNb, NiFeB, NiFeNbB, NiFeMo, and NiFeCr; permalloy materials with an additive of cobalt such as CoNiFe, CoNiFeSi, CoNiFeB, and CoNiFeNb; cobalt; and cobalt-based alloys such as CoB, CoSi, CoNi, and CoFe. The seed layer has preferably a thickness sufficient to control a crystal structure of the magnetic recording layer and, in ordinary cases, is deposited to a thickness in the range of 3 nm to 50 nm.

The intermediate layer, which is optionally provided, can be composed of ruthenium or an alloy mainly composed of ruthenium. The intermediate layer has a thickness ordinarily in the range of 0.1 to 20 nm. A thickness in this range gives characteristics required for high density recording to the magnetic recording layer without degradation in magnetic performance and electromagnetic conversion performance of the magnetic recording layer.

The nonmagnetic underlayer, the soft magnetic layer, the seed layer, the intermediate layer, and the magnetic recording layer can be formed by any method known in the art including sputtering methods (including a DC magnetron sputtering method and an RF magnetron sputtering method) and a vacuum deposition method.

A protective film of a DLC film is preferably formed by means of a plasma CVD method using a raw material of hydrocarbon gas. Useful hydrocarbon gases include ethylene, acetylene, methane, and benzene. Electric power for plasma generation can be supplied in a capacitance-coupled scheme or a induction-coupled scheme. Useful plasma generation devices include a parallel plate type device, a filament type device, an ECR plasma generation device, and a helicon wave plasma generation device. Useful types of supplying power include a dc power, an HF power (a frequency in a range of several tens to several hundreds of kHz), an RF power (frequencies at 13.56 MHz, 27.12 MHz, or 40.68 MHz), and a microwave power (a frequency at 2.45 GHz).

The deposition of the DLC film can be promoted by applying a bias voltage on the lamination of a substrate and a metallic film layer. For example, a voltage in the range of −40 to −120 V can be applied on the lamination to be deposited, and a protective film of a DLC film is preferably deposited to a thickness in the range of 2.0 to 4.0 nm.

Then, the surface treatment is conducted on the protective film. The surface treatment includes an argon plasma treatment and a nitrogen plasma treatment. In a preferred procedure, the argon plasma treatment is conducted after formation of the protective film and before the nitrogen plasma treatment. Accordingly, nitrogen plasma treatment is completely separated from the protective film formation by the intervening argon plasma treatment.

The plasma treatment with an argon gas can use the same power supply scheme, device, and the supplying power as used in the formation of the protective film. Further, the plasma treatment with argon gas can be carried out, for example, by substituting argon gas for the hydrocarbon gas used in the formation of the protective film in the plasma CVD device.

Further, the plasma treatment with argon gas is preferably conducted in a time duration in the range of 0.5 to 2.0 seconds. This treatment reduces hydrogen on the outermost surface of the protective film of DLC film and suppresses adhesion of acidic impurities, especially sulfur-containing impurities.

Again, in the process of plasma treatment with a gas containing at least nitrogen gas, the power supply scheme, the device, and the supplying power can be those used in formation of the protective film. Like in the treatment with argon gas, the plasma treatment with nitrogen gas can be carried out by substituting a gas to be used in the plasma treatment for the gas used in the formation of the protective film in the plasma CVD device. Alternatively, another separate plasma CVD device can be used for conducting the plasma treatment with the gas containing nitrogen.

The gas to be used in the nitrogen plasma treatment can be a pure nitrogen gas or a mixture gas of nitrogen gas and another gas. For example, the other gas can be selected from inert gases such as helium, neon, and argon.

The nitrogen plasma treatment is preferably conducted in a time duration in the range of 1.0 to 3.0 seconds. This treatment makes a nitrogen bond to the outermost surface of the protective film of a DLC film, to achieve good bonding between the protective film and a lubricant film, which will be described later.

The argon plasma treatment and the nitrogen plasma treatment described above achieve suppression of adhesion of contamination gas of acidic impurities especially sulfur-containing impurities, and at the same time, good bonding with the lubricant film, to obtain a protective film with a reduced thickness.

The second aspect of the present invention is a protective film of a magnetic recording medium that is formed by the method of the first aspect of the invention. As described earlier, the protective film of the invention is a single layer film, and can achieve suppression of adhesion of contamination gas of acidic impurities especially sulfur-containing impurities, and at the same time, good bonding with the lubricant film.

The third aspect of the present invention is a magnetic recording medium comprising a substrate, a metallic film layer formed on the substrate, and a protective film formed on the metallic film layer by the method of the first aspect of the invention. A magnetic recording medium of the invention can further comprise a lubricant layer on the protective film. The lubricant film gives lubricity at the time of contact between the magnetic recording medium and a magnetic head for read/write. The lubricant film can be formed of a liquid lubricant of perfluoropolyether or other liquid lubricant known in the art. The lubricant film can be formed by means of any application techniques known in the art including a dip-coating method and a spin-coating method.

The magnetic recording medium of the invention has a protective film that is formed in a single layer. Therefore, the spacing between the magnetic recording layer and the magnetic head can be reduced, which is advantageous for attaining high recording density of the magnetic recording medium.

Example 1

A metallic film layer was formed on an aluminum substrate with a diameter of 95 mm and a thickness of 1.75 mm by sequentially depositing an underlayer of CoZrNb 40 nm thick, an intermediate layer of ruthenium 15 nm thick, and a magnetic recording layer of CoCrPt—$SiO_2$ 15 nm thick.

The obtained lamination was installed in a deposition chamber of a filament type plasma CVD device. Ethylene gas was introduced into the deposition chamber at a flow rate of 40 sccm. A dc power was supplied at 180 V between a cathode filament and an anode, and ethylene plasma was generated by emission of thermal electrons from the cathode filament. The pressure in the deposition chamber was 0.53 Pa. A bias voltage at −120 (relative to the ground potential) was applied on the lamination to deposit a DLC film. Adjusting the deposition time, a DLC film was formed to a thickness of 3.0 nm.

After completion of DLC film deposition, argon gas was introduced at a flow rate of 50 sccm substituting for the ethylene gas. Argon gas plasma treatment was conducted under a pressure of 0.67 Pa for 0.5 sec. Then, argon gas flow was changed to 30 sccm and at the same time, nitrogen gas was introduced at a flow rate of 20 sccm, and nitrogen plasma treatment was conducted under a pressure of 0.67 Pa for 1.0 sec, to obtain a sample. In the substeps of argon plasma treatment and nitrogen plasma treatment, as in the step of DLC film deposition, a bias voltage at −120 V (relative to the ground potential) was applied on the lamination with the DLC film formed thereon and a dc power was supplied at 180 V between the cathode filament and the anode to generate plasma. FIG. 1 shows the sequence of gas introduction in this Example 1. In FIG. 1, the reference numeral 1 designates the flow rate of ethylene gas, the reference numeral 2, the argon gas flow rate, and the reference numeral 3, the nitrogen gas flow rate.

The thus obtained sample was exposed to $SO_2$-containing test gas at the atmospheric pressure for 2 hours. After that, the amount of $SO_2$ gas adhesion was measured by ion chromatography. The $SO_2$-containing test gas contained 40 ppm of $SO_2$ in nitrogen gas ($N_2$). The amount of $SO_2$ gas adhered on the sample of Example 1 was 0.80 ng/cm$^2$, which was a satisfactory value. This result can be attributed to a reduced amount of hydrogen on the surface of the DLC film owing to the argon plasma treatment, which is adhesion site of the $SO_2$ gas. Thus, the adhesion of $SO_2$ gas was suppressed.

On the obtained DLC film (a protective film) of the sample, liquid lubricant of perfluoropolyether was applied by a dip-coating method, to form a lubricant film. The lubricant film had a sufficient thickness of 1.2 nm (which was measured by a infrared (IR) spectroscopy), and the bonding characteristic between the DLC film (a protective film), and the lubricant film was satisfactory.

Example 2

A sample of Example 2 was obtained in the same manner as in Example 1 except that the gas for the nitrogen plasma treatment was changed from the mixture gas of argon gas at a flow rate of 30 sccm and nitrogen gas at a flow rate of 20 sccm, to nitrogen gas at a flow rate of 30 sccm.

The obtained sample was exposed to the $SO_2$-containing test gas in the same conditions as in Example 1. An amount of $SO_2$ gas adhered on the sample of Example 2 was 0.85 ng/cm$^2$, which was again a satisfactory value.

On the obtained DLC film (a protective film) of the sample, liquid lubricant of perfluoropolyether was applied by the dip-coating method, to form a lubricant film. The lubricant film had a sufficient thickness of 1.2 nm (which was measured by the infrared (IR) spectroscopy), and the bonding characteristic between the DLC film (a protective film), and the lubricant film was satisfactory.

Example 3

The same procedure as in Example 1 was conducted including formation of a metallic film layer on an aluminum substrate, formation of a DLC film, and argon plasma treatment.

After the argon plasma treatment, the resulted lamination was moved to another separate filament type plasma CVD device, in which nitrogen plasma treatment was conducted in a mixture gas of argon gas at a flow rate of 30 sccm and nitrogen gas at a flow rate of 20 sccm in the same plasma generating conditions as in Example 1 for 1.0 sec to obtain a sample of Example 3.

The obtained sample was exposed to the $SO_2$-containing test gas in the same conditions as in Example 1. An amount of $SO_2$ gas adhered on the sample of Example 3 was 0.75 ng/cm², which was yet satisfactory value.

On the DLC film (a protective film) of the obtained sample, liquid lubricant of perfluoropolyether was applied by a dip-coating method to obtain a lubricant film. The lubricant film had a sufficient thickness of 1.2 nm (which was measured by infrared (IR) spectroscopy), and the bonding characteristic between the DLC film (a protective film), and the lubricant film was satisfactory.

Comparative Example 1

A sample of Comparative Example 1 was obtained in the same manner as in Example 1 except that argon plasma treatment was not conducted.

The obtained sample was exposed to the $SO_2$-containing test gas in the same conditions as in Example 1. An amount of $SO_2$ gas adhered on the sample of Comparative Example 1 was 1.05 ng/cm², which was inappropriately large value. Because of elimination of argon gas treatment, the hydrogen, which is adhesion site for $SO_2$ gas remained on the surface of the DLC film, failing to suppress adhesion of the $SO_2$ gas.

The invention has been described with reference to certain preferred embodiments thereof. It will be understood, however, that modifications and variations are possible within the scope of the appended claims.

This application is based on, and claims priority to, Japanese Patent Application No. 2008-218568, filed on Aug. 27, 2008 contents of which are incorporated herein by reference.

What is claimed is:

1. A method of forming a protective film comprising the following steps in order:
   forming a protective film on a lamination, the lamination including a substrate and a metallic film layer formed on the substrate, by means of a plasma CVD method using a raw material of a hydrocarbon gas, and
   performing a two-step surface treatment on the protective film, consisting of:
   a first surface treatment on the protective film after the supply of the hydrocarbon gas is stopped, wherein the first surface treatment includes a plasma treatment with argon gas alone, and then
   a second surface treatment, wherein the second surface treatment is a plasma treatment with a gas containing either nitrogen gas alone or a mixture of nitrogen gas and an inert gas,
   wherein the second surface treatment is carried out by a second plasma CVD device that is separate from the CVD device used in the formation of the protective film,
   and wherein a lubricant layer is deposited after the second surface treatment, without an intervening plasma treatment
   and wherein the second surface treatment makes a nitrogen bond to the outermost surface of the protective film to achieve good bonding between the protective film and the lubricant film.

2. The method of forming a protective film according to claim 1, wherein the substrate is nonmagnetic and the metallic film layer formed on the substrate includes at least a magnetic recording layer.

3. The method of forming a protective film according to claim 2, wherein the metallic film layer further includes a nonmagnetic underlayer, a soft magnetic layer, a seed layer, and an intermediate layer between the magnetic recording layer and the substrate.

4. The method of forming a protective film according to claim 2, wherein the magnetic recording layer comprises at least cobalt and platinum.

5. The method of forming a protective film according to claim 2, wherein the magnetic recording layer has a thickness of at most 30 nm.

6. The method of forming a protective film according to claim 3, wherein the nonmagnetic underlayer includes titanium or a nonmagnetic material containing chromium.

7. The method of forming a protective film according to claim 3, wherein the soft magnetic layer comprises crystalline materials.

8. The method of forming a protective film according to claim 7, wherein a thickness of the soft magnetic layer is in the range of 10 to 500 nm.

9. The method of forming a protective film according to claim 3, wherein the seed layer comprises permalloy materials.

10. The method of forming a protective film according to claim 9, wherein a thickness of the seed layer is in the range of 3 nm to 50 nm.

11. The method of forming a protective film according to claim 3, wherein the intermediate layer comprises ruthenium or an alloy of ruthenium.

12. The method of forming a protective film according to claim 11, wherein a thickness of the intermediate layer is in the range of 0.1 to 20 nm.

13. The method of forming a protective film as claimed in claim 1, wherein the plasma treatment with argon gas is conducted in the time duration range of 0.5 to 2.0 seconds.

14. The method of forming a protective film as claimed in claim 1, wherein the plasma treatment with a gas containing at least nitrogen is conducted in the time duration range of 1.0 to 3.0 seconds.

15. A method of forming a protective film comprising the following steps in order:
   forming a protective film on a lamination, the lamination including a substrate and a metallic film layer formed on the substrate, by means of a plasma CVD method using a raw material of a hydrocarbon gas, and
   performing a two-step surface treatment on the protective film, consisting of:
   a first surface treatment on the protective film after the supply of the hydrocarbon gas is stopped, wherein the first surface treatment includes a plasma treatment with argon gas alone, and then
   a second surface treatment, wherein the second surface treatment is a plasma treatment with a gas containing either nitrogen gas alone or a mixture of nitrogen gas and an inert gas,
   wherein a lubricant layer is deposited after the second surface treatment
   and wherein the second surface treatment makes a nitrogen bond to the outermost surface of the protective film to achieve good bonding between the protective film and the lubricant film.

16. The method of forming a protective film according to claim 15, wherein the substrate is nonmagnetic and the metallic film layer formed on the substrate includes at least a magnetic recording layer.

17. The method of forming a protective film according to claim 16, wherein the metallic film layer further includes a nonmagnetic underlayer, a soft magnetic layer, a seed layer, and an intermediate layer between the magnetic recording layer and the substrate.

18. The method of forming a protective film according to claim 16, wherein the magnetic recording layer comprises at least cobalt and platinum.

19. The method of forming a protective film according to claim 16, wherein the magnetic recording layer has a thickness of at most 30 nm.

20. The method of forming a protective film according to claim 17, wherein the nonmagnetic underlayer includes titanium or a nonmagnetic material containing chromium.

21. The method of forming a protective film according to claim 16, wherein the soft magnetic layer comprises crystalline materials.

22. The method of forming a protective film according to claim 21, wherein a thickness of the soft magnetic layer is in the range of 10 to 500 nm.

23. The method of forming a protective film according to claim 17, wherein the seed layer comprises permalloy materials.

24. The method of forming a protective film according to claim 23, wherein a thickness of the seed layer is in the range of 3 nm to 50 nm.

25. The method of forming a protective film according to claim 17, wherein the intermediate layer comprises ruthenium or an alloy of ruthenium.

26. The method of forming a protective film according to claim 25, wherein a thickness of the intermediate layer is in the range of 0.1 to 20 nm.

27. The method of forming a protective film as claimed in claim 15, wherein the plasma treatment with argon gas is conducted in the time duration range of 0.5 to 2.0 seconds.

28. The method of forming a protective film as claimed in claim 15, wherein the plasma treatment with a gas containing at least nitrogen is conducted in the time duration range of 1.0 to 3.0 seconds.

* * * * *